J. G. HEASLET.
CONTROLLING DEVICE OF MOTOR VEHICLES.
APPLICATION FILED SEPT. 25, 1917.
1,318,146.
Patented Oct. 7, 1919
3 SHEETS—SHEET 3.
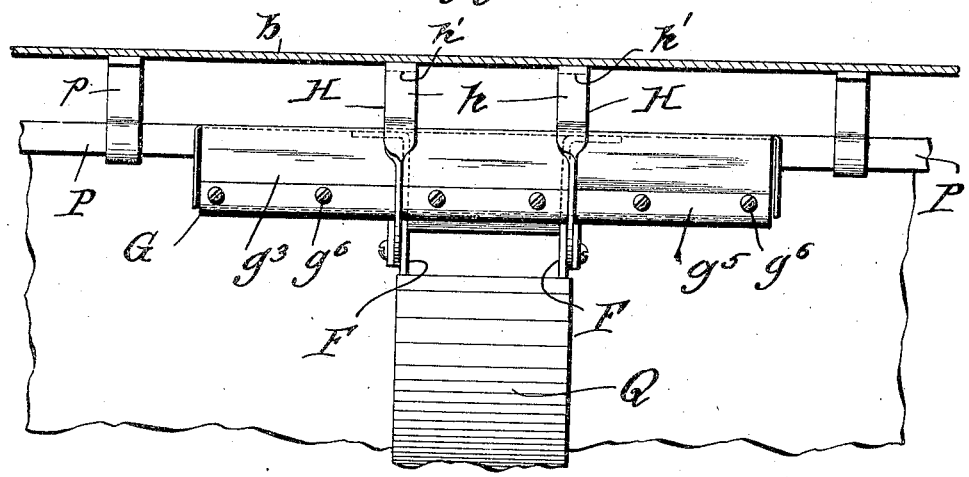
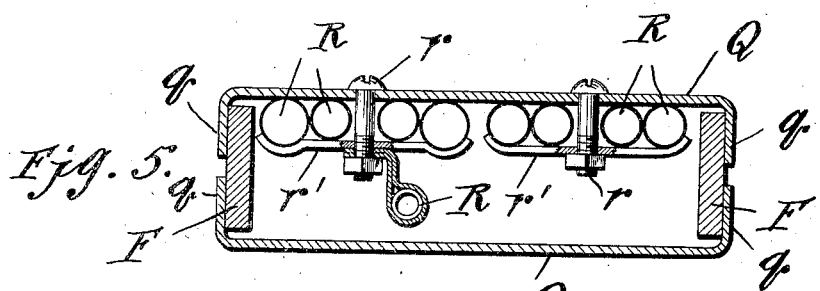
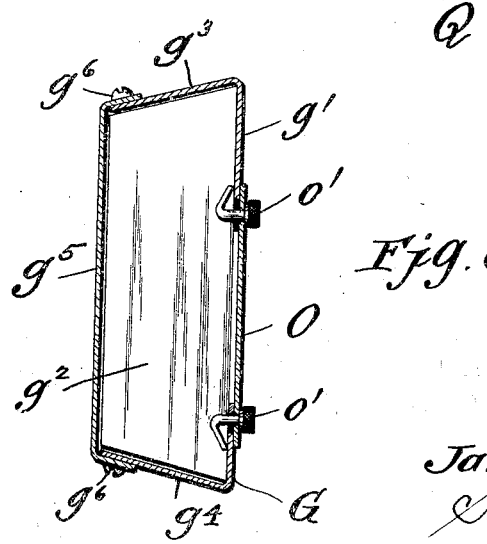
INVENTOR
James G. Heaslet.
BY
his ATTORNEYS

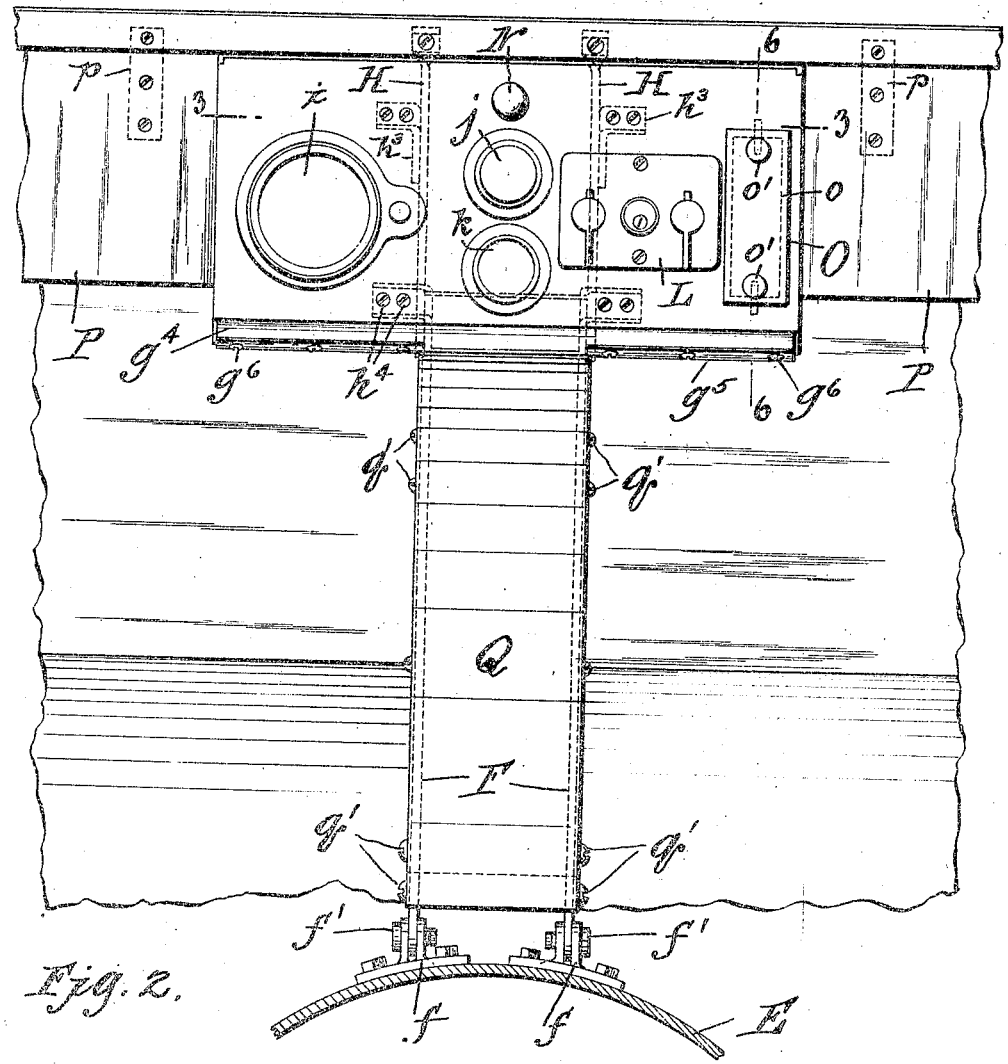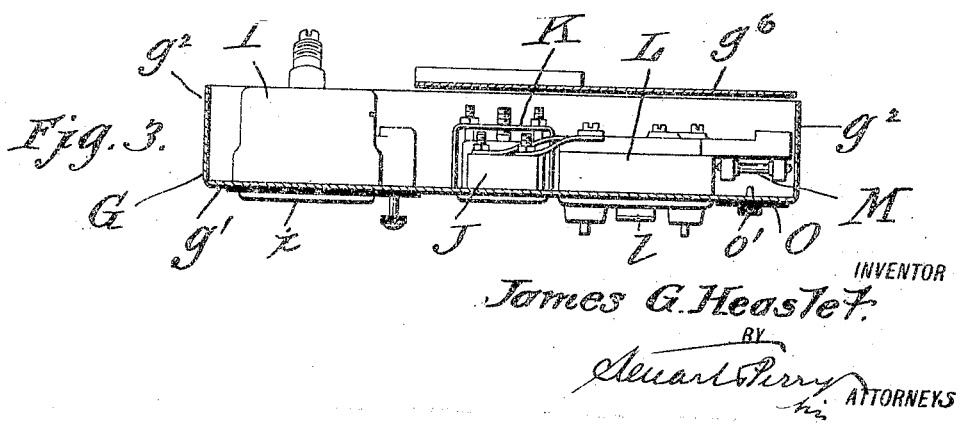

UNITED STATES PATENT OFFICE.

JAMES G. HEASLET, OF DETROIT, MICHIGAN, ASSIGNOR TO THE STUDEBAKER CORPORATION, A CORPORATION OF NEW JERSEY.

CONTROLLING DEVICE OF MOTOR-VEHICLES.

1,318,146.      Specification of Letters Patent.      Patented Oct. 7, 1919.

Application filed September 25, 1917. Serial No. 193,096.

*To all whom it may concern:*

Be it known that I, JAMES G. HEASLET, a citizen of the United States of America, and resident of Detroit, in the county of Wayne and State of Michigan, have invented certain new and useful Improvements in Controlling Devices of Motor-Vehicles, of which the following is a specification.

This invention is an improved arrangement of the controlling devices of a motor vehicle, and the object of the invention is to facilitate the installation of these devices, as well as the investigation of subsequent troubles after the machine has been subjected to the wear and tear occasioned by continued use.

It has been the general practice, in the manufacture of motor vehicles, to assemble such devices or instruments as switches, light controlling instruments, the carbureter control, the speedometer, the oil and pressure gages, and other devices, on the chassis of the vehicle and thereafter make the necessary connections during the vehicle assembly. This is generally a laborious and difficult operation, due to the inaccessible location of the connecting parts and the necessity of employing numerous junction boxes and connecting plugs. Moreover, the connections to the various devices must be housed in concealed positions for æsthetic reasons, and this generally necessitates the provision of conduits or the boring of the walls of the body so that the wiring or piping connections may be led in concealed positions behind the dash and toe boards and other parts of the body, and brought through into the interior of the body to be connected with the devices in question. For these reasons, the present practice is laborious and expensive, and the inaccessible location of the connecting parts renders it difficult to subsequently make repairs.

With the foregoing considerations in mind, the object of the present invention is to arrange said control devices in such manner that they may be mounted in proper relation to one another on a bench, after which the assembly may be applied to the vehicle as a unit. This arrangement permits the connections to be made efficiently on a bench and the unit thereafter applied to the vehicle with the least expenditure of time and trouble.

A further object of the invention is the concentration of electrical controls and connections to facilitate the investigation of troubles and to eliminate junction boxes and connection plugs, which were formerly employed to connect the control elements mounted on the vehicle to those mounted on the body.

A further feature of the invention is the complete inclosure of all the connecting wires and piping to the control devices, whereby the general appearance of the interior forward portion of the body beneath the dash is greatly improved, and said parts are, moreover, rendered less liable to be tampered with and rendered inoperative.

Features of the invention, other than those specified, as well as the advantages thereof, will be apparent from the hereinafter detailed description taken in conjunction with the accompanying drawings.

In the accompanying drawings I have illustrated different practical embodiments of the invention, but the constructions therein shown are to be understood as illustrative only, and not as defining the limits of the invention.

Fig. 2 is a section on the line 2—2 of Fig. 1, showing the preferred form of the invention as it appears from the driver's seat, when the toe boards are removed.

Fig. 3 is a section in the plane of the line 3—3 of Fig. 2.

Fig. 4 is a section in the plane of the line 4—4 of Fig. 1.

Fig. 5 is a section in the plane of the line 5—5 of Fig. 1, and

Fig. 6 is a section in the plane of the line 6—6 of Fig. 2.

Figure 1:
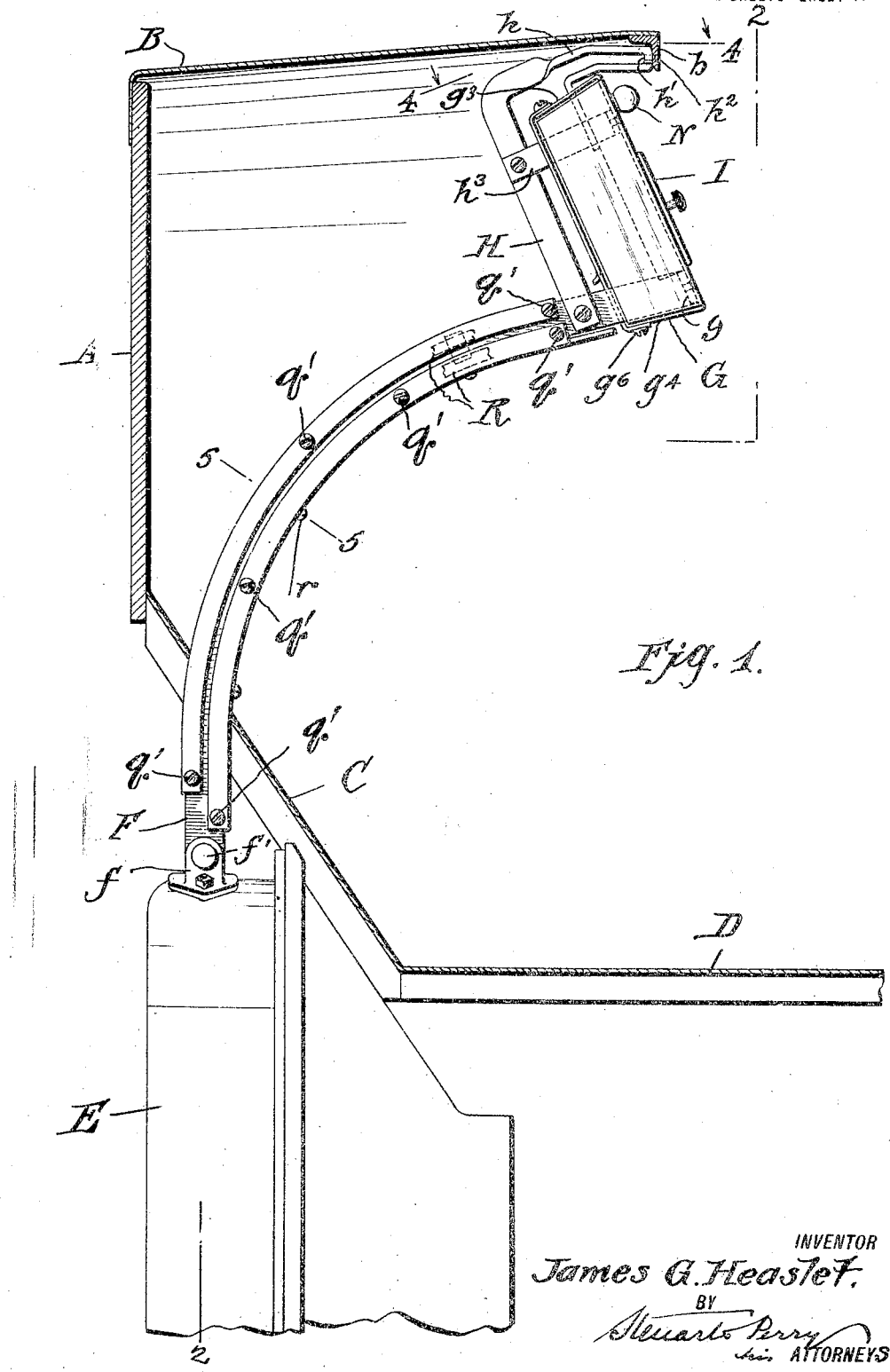
Figure 1 illustrates an arrangement embodying the present invention installed in a motor vehicle, the forward portion of the body of said vehicle being shown in section in the interest of clearness.

In Fig. 1 of the drawings the forward portion of a car body is shown, A designating the dash, B the cowl, C the toe boards, and D the floor of the car, beneath and forward of which is positioned the fly-wheel casing E, as is usual. In adapting the present invention to this type of car, two curved brackets F are hinged to the chassis at convenient points, shown in the drawings as directly to the fly-wheel casing E, by means of standards $f$ secured by lag screws to said casing. The hinge pins $f'$ for this connection are alined, so that both brackets F are adapted to oscillate about a common axis.

Brackets F are longitudinally curved edgewise and extend upwardly through an aperture in the toe boards C to a point substantially beneath the forward edge of the cowl. They form a support for a casing G, on the walls of which the various control instruments are mounted. Brackets F pass through the back of casing G, and their free ends are turned at an angle to form attaching lugs $g$ which are riveted or otherwise secured to the front wall of casing G, as clearly shown in Figs. 1 and 2.

Secured to brackets F just rearwardly of casing G are two sustaining arms H which extend upwardly behind the casing, and above the top thereof are twisted and brought forward, as at $h$, to provide a foot $h'$ adapted to normally engage with the depending flange of an angle-iron $b$ which extends across the under, forward edge of cowl B, as clearly shown in Figs. 1 and 2. A screw $h^2$ passes through an aperture in angle-iron $b$, in juxtaposition with each foot $h'$, and threads into the latter, for the purpose of securing sustaining arms H rigid with respect to the forward edge of the cowl, and, in so doing, secure brackets F against pivotal movement. Casing G is, moreover, made rigid with arms H by braces $h^3$ secured to the arms back of the casing, extending forwardly into said casing, and provided with laterally turned ends secured to the front wall of the casing by screws or rivets $h^4$. In this manner, casing G is rigidly mounted on the free ends of brackets F and the brackets are precluded from pivotal movement by screws $h^2$, which secure the same to the stiffening angle $b$ of the cowl.

Casing G may be constructed in any desired manner, but, in the simple form of structure shown, it embodies a front wall $g'$, the four edges of which are turned back to form the sides $g^2$, top $g^3$, and bottom $g^4$, of the casing. The back is in the form of a separate plate $g^5$, which is flanged over the exterior of the top and bottom plates $g^3$ and $g^4$ and is preferably secured thereto by screws $g^6$.

It will be noted from Fig. 1 that this arrangement positions the casing immediately beneath the rear edge of the cowl, being so placed that the front wall $g'$ of this casing will be inclined and thus be in full sight of the driver at all times. Accordingly, by positioning the controlling devices within casing G in such manner that their dials, operating handles, switch keyholes, or other signaling or operative accessories, project through the front plate $g'$, they will be most conveniently positioned to be seen and operated. In the drawings, I have chosen to show a plurality of such controlling devices, embodying in the arrangement a speedometer I, a battery gage J, an oil pressure gage K, a box L including switches of the lighting and ignition circuits, and one or more fuses M included in the electric circuits. It will be noted that the key-operated barrel $l$ of box L extends through the front plate $g'$, as do also the dials $j$ and $k$ of the battery and oil pressure gages, and the same is true of the dial $i$ of the speedometer. Substantially midway of the width of the casing, and near the top thereof, the usual pilot light N projects forwardly through the front plate $g'$ and serves to illuminate the exterior of said plate and the operating and signaling adjuncts associated therewith. In order that fuses M may be readily replaced when burned out, front plate $g'$ is provided with a handhole $o$, which is normally covered by a plate O adapted to be maintained in place, to conceal the hand-hole, by means of thumb screws $o'$.

For the purpose of illustration, the majority of the controlling devices usually employed are shown as associated with the casing, but it will be understood that these may be increased or decreased in number as desired. It is preferable that all of the controlling devices be mounted within the casing, so that, when the casing is moved, all of the devices are simultaneously shifted as a unit.

Casing G may be made of any width less than the inside width of the car body beneath the cowl, in order to contain the desired number of controlling adjuncts, but, if made of less width, it is preferably abutted at its ends by aprons P secured to angle-iron $b$ by straps $p$, chiefly for æsthetic purposes.

Each of the controlling devices is connected, by an electric circuit or a line of piping or tubing, with the parts of the motor construction to which they correspond, and, in order that these connections may be led to casing G in a compact and concealed manner, two plates Q, curved longitudinally to conform to the curvature of brackets F, are employed, and each of these plates is provided with a marginal flange $q$ adapted to overlap the outer sides of the brackets, as shown in detail in Fig. 5. When the plates are positioned at the front and back of the brackets, and bridge the space between them, a conduit is formed between the brackets, which conduit extends from a point just above fly-wheel casing E upwardly to a point just rearwardly of casing G. In this manner, a conduit is provided whereby wires and piping may be led in concealed positions from casing G to a point beneath the floor of the car. These wires or piping may be secured at suitable intervals along the conduit to preclude rattling, as shown in Fig. 5, in which a plurality of such connections R are shown as clamped to the back wall of the conduit by means of screws $r$ bearing against crossarms $r'$. It will be understood that plates Q may be secured to brackets F in any suitable manner, as by rivets or screws $q'$.

In the manufacture of a vehicle embodying the present invention, the parts of the chassis and body are associated and constructed in the usual way, with the exception that threaded taps are provided for securing standards $f$ to the fly-wheel casing, and an aperture is provided in toe boards C through which the brackets and associated conduit may extend. During the operation of assembling these parts of the car, no particular attention need be paid to the wiring or piping connections for the controlling devices. Casing G, brackets F, and other parts associated therewith, are assembled at a bench, all the controlling devices to be associated with casing G are properly arranged, and the wiring and piping connections are properly coupled up and led through the conduit between brackets F. These connections are left sufficiently long at the end of the conduit to allow them to be properly connected to the respective parts which they control.

After all of these parts have been assembled at the bench, casing G and the brackets secured thereto, with all the connections in place, are picked up as a unit and transported to the otherwise finished vehicle, where the toe boards C, which are generally made removable, are lifted out and standards $f$ secured to fly-wheel casing E. The loose ends of the connections are next coupled up to the respective parts of the engine and associated mechanisms. During these operations, brackets F may be swung down on their pivots $f'$, so that the lower edge of casing G will rest upon the floor D of the car. However, after the parts have been connected up, the brackets are swung upwardly and the feet $h'$ of supporting arms H are swung behind the angle-iron $b$ at the rear edge of the cowl, and the screws $h^2$ inserted to lock the parts in the positions which they thus assume. At the conclusion of the assembly, toe boards C are returned to proper position and the work is finished. Thus, all of the controlling devices may be mounted as a unit upon a car, after it is otherwise completed, in a most simple and efficient manner, which is in marked contrast to the laborious and difficult operation of mounting the parts separately, in inaccessible positions, on a vehicle during the assembly of the vehicle and body parts, as has generally heretofore been the case.

Aside from the ease of initial assembly, the structure is such as to allow of and facilitate the investigation of troubles subsequently occurring in the controlling devices. Should it be desirable at any time to investigate trouble in these parts, it is only necessary to lift out the toe boards, remove screws $h^2$, swing the feet $h'$ of supporting arms H free from engagement with angle-iron $b$, and tilt brackets F forwardly. When in this position, the parts within the casing may be readily exposed by removing the back of the casing, or the connections running through the conduit may be revealed by removing one of the plates Q.

The foregoing method of associating the controlling devices not only renders the appearance of the space beneath the cowl more aesthetic, but entirely conceals wiring or piping connections from view, from the driver's seat, in a casing and conduit which prevents the depositing of grease or dirt on the parts. They are thus kept clean and free from dust at all times.

I am aware that it is old to mount a plurality of controlling instruments or gages on an instrument board positioned beneath the cowl, but, in such devices, the wiring connections to said instruments generally pass to junction boxes and plugs, so as to allow of the breaking of the connections when it is desired to take down the instrument board, which is usually accomplished by unscrewing it from the body so as to entirely release the same. Moreover, in these prior structures, the wiring or other connections are individually led to the back of the instrument board in the open, from beneath the hood through holes in the dash, or through conduits in the frame of the car so formed and associated with the instrument board that, when the latter is taken down, the connections must be broken. In order to inspect the instruments from the interior of casing G of this invention, it is not necessary to break any connections or to disconnect any of the parts. Moreover, the prior devices in question were open to the objection that the connections were made during the construction of the car, and said connections occupied inaccessible positions which rendered their installation laborious and slow. They were not susceptible to complete assembly at a bench, as is the present invention, nor were they anywhere near as easily installed or subsequently repaired or investigated.

Having thus fully described the invention, what I claim as new and desire to secure by Letters Patent, is:

1. An arrangement of the character described embodying an instrument board, a plurality of instruments mounted thereon, wiring and piping connections to said instruments, and means for supporting the instrument board on a vehicle, said supporting means serving as a conduit for the wiring and piping connections of the instrument, the instrument board, supporting means and connections being so constituted that they may be assembled at a bench and applied to the vehicle as a unit.

2. A unit construction of the character described embodying an instrument board, a plurality of instruments mounted thereon, wiring and piping connections for said instruments, and means for supporting the instrument board on a vehicle and simultaneously serving as a conduit for the wiring and piping connections of the instruments, the said parts being assembled as a unit and adapted to be thus installed on a vehicle and supported entirely independently of the steering post of the vehicle.

3. A unit construction of the character described embodying an instrument board, a plurality of instruments mounted thereon, means for pivotally mounting the instrument board on a vehicle, and means for normally precluding pivotal movement thereof, the said parts being assembled as a unit and adapted to be thus installed on a vehicle.

4. An arrangement of the character described embodying an instrument board, a plurality of instruments mounted thereon, operating connections associated with said instruments, and a supporting arm associated with the instrument board and serving as a housing for the operating connections of the instruments, and means for securing the supporting arm to a vehicle, whereby the instruments may be mounted upon the instrument board, properly connected up at a bench and the whole thereafter mounted, as a unit, upon a vehicle by simply securing the supporting arm to said vehicle.

5. An arrangement of the character described embodying an instrument board, a plurality of instruments mounted thereon, a supporting arm rigidly secured at one end of the instrument board and pivotally mounted at its other end to a vehicle, operating connections associated with said instruments, and means for normally precluding pivotal movement of the supporting arm.

6. An arrangement of the character described embodying an instrument board, a plurality of instruments mounted thereon, a supporting arm forming a conduit, operating connections communicating with the several instruments and extending through the conduit of the supporting arm, whereby the instruments may be mounted on the instrument board, the supporting arm secured thereto, and the instruments connected up at a bench, and the whole thereafter mounted, as a unit, on a motor vehicle.

7. In an arrangement of the character described, the combination of an instrument board, a plurality of instruments mounted thereon, with the necessary wiring and piping for said instruments, together with suitable supporting means, the whole being arranged as an independent assembly adapted to be rigidly applied to or removed from the chassis of a motor vehicle, and supported thereon independently of the body of said vehicle.

8. In an arrangement of the character described, the combination of an instrument board, a plurality of instruments mounted thereon, with the necessary wiring and piping for said instruments, together with suitable supporting means embodying a conduit for inclosing said wiring and piping, the entire assembly being so arranged that it may be readily applied to or removed from the vehicle as a unit.

9. In an arrangement of the character described, the combination of an instrument board, a plurality of instruments thereon, together with the necessary wiring and piping to said instruments, mounted on a bracket rotatably fastened to the chassis of said vehicle so that it may be swung up into position after installing the body onto said vehicle, said combination being assembled as a unit adapted to be readily applied to or removed from said vehicle.

10. In an arrangement of the character described, the combination of an instrument board, a plurality of instruments thereon, wiring and piping to said instruments, together with suitable supporting means, so arranged as an independent assembly that this assembly may be readily applied to or removed from said vehicle as a unit, said instrument board being so arranged that a single insulating block with conducting inserts and connections serves as switch base, junction block and fuse board.

11. In an arrangement of the character described, the combination of an instrument board, a plurality of instruments thereon, wiring and piping to said instruments, together with suitable supporting means, so mounted on the chassis of said vehicle that it is independent of the body of said vehicle, so that the body may be applied or removed without disturbing the instrument board and connections thereto.

12. In an arrangement of the character described, the combination of an instrument board, a plurality of gages, and meters thereon, a plurality of switches thereon, a plurality of control buttons or levers thereon, a plurality of instrument lights thereon, fuse compartment thereon, together with necessary wiring and piping to these devices, fastened with suitable supports and inclosing covers mounted on the vehicle so as to be an independent unit.

Signed by me at Detroit, Michigan, this 21st day of August 1917.

JAMES G. HEASLET.

Witnesses:
A. HARRY GEORGE,
A. H. HUME.